No. 874,110. PATENTED DEC. 17, 1907.
J. C. PACKARD.
APPARATUS FOR DETERMINING THE LAW OF FALLING BODIES.
APPLICATION FILED JULY 25, 1907.
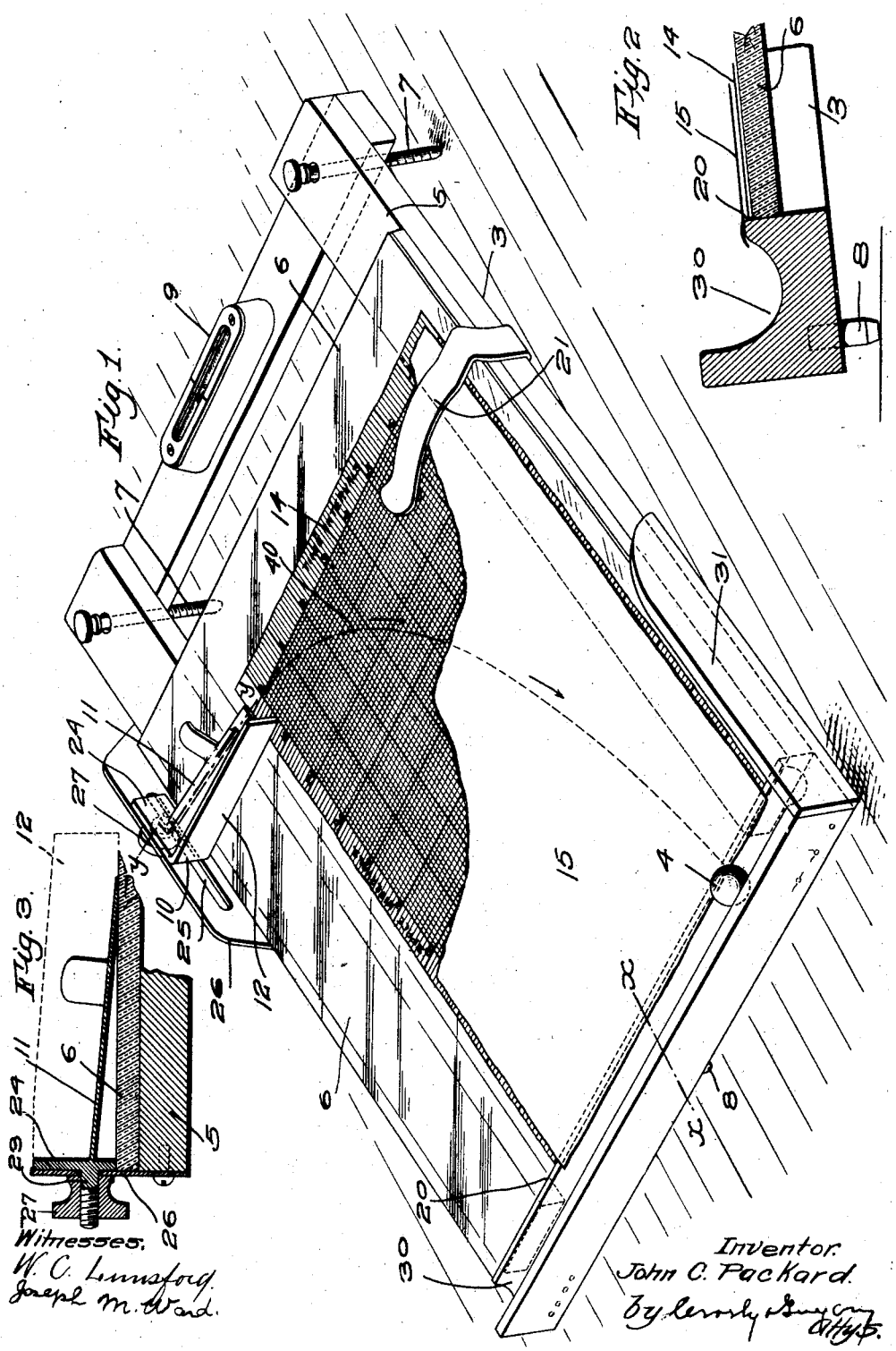
Witnesses.
W. C. Lunsford
Joseph M. Ward.
Inventor.
John C. Packard.
By [signature]
Attys.

UNITED STATES PATENT OFFICE.

JOHN C. PACKARD, OF BROOKLINE, MASSACHUSETTS, ASSIGNOR TO L. E. KNOTT APPARATUS COMPANY, OF BOSTON, MASSACHUSETTS, A CORPORATION OF MASSACHUSETTS.

APPARATUS FOR DETERMINING THE LAW OF FALLING BODIES.

No. 874,110.  Specification of Letters Patent.  Patented Dec. 17, 1907.

Application filed July 25, 1907. Serial No. 385,461.

*To all whom it may concern:*

Be it known that I, JOHN C. PACKARD, a citizen of the United States, and a resident of Brookline, in the county of Norfolk and State of Massachusetts, have invented an Improvement in Apparatus for Determining the Law of Falling Bodies, of which the following description, in connection with the accompanying drawing, is a specification, like letters on the drawing representing like parts.

This invention has for its object to provide a novel apparatus by which the well known law of falling objects can be demonstrated.

The invention is especially useful in physical laboratories for giving students an opportunity to demonstrate the correctness of this law.

One of the most common machines now in use for demonstrating this law of gravitation is what is known as "Atwood's machine," but this machine has no means for graphically illustrating the law of falling bodies.

In making the present invention I have aimed to provide a simple device which will not only demonstrate to the students the correctness of this law of falling bodies but will also graphically illustrate the law.

In the drawings wherein I have shown one simple embodiment of my invention for the purpose of illustrating the principle thereof, Figure 1 is a perspective view of an apparatus embodying my invention; Fig. 2 is a section on the line $x-x$, Fig. 1; Fig. 3 is a section on the line $y-y$, Fig. 1.

In carrying out my invention I make use of an inclined plane and a rolling object, preferably in the form of a ball, which is adapted to roll down the inclined plane. The ball is projected onto the inclined plane in a direction at right angles to the inclination thereof, and as soon as the ball leaves the projecting means it is acted upon by gravity and caused to roll toward the bottom of the inclined plane. At the same time the ball has a motion transversely to the inclined plane, the amount of which depends upon the speed with which the ball is projected onto the inclined plane. The result is that as the ball rolls over the inclined plane it will plot a curved line thereon which will indicate graphically the well known law of falling bodies, for the distance of the ball at any point in its course from a zero line extending longitudinally of the inclined plane and passing through the point at which the ball is projected onto the plane will represent the units of time which the ball has been acted upon by gravity; and the distance of said ball at any point in its course from a zero line extending transversely to the inclined plane and passing through the point at which the ball is projected onto the plane will indicate the units of distance through which the ball has fallen during the intervals of time represented by the corresponding units of time. For making a permanent record of this line I propose to place carbon or other impression paper on the inclined plane and to place under the carbon paper a blank sheet on which the line is to be traced. The rolling of the ball over the carbon paper will leave an impression on the record sheet beneath the carbon paper, and if this record sheet is properly marked to indicate time intervals and space intervals the curved line outlined on the sheet will demonstrate the well known law of falling bodies.

Referring now to the drawings wherein I have shown the preferred embodiment of my invention the inclined plane is designated generally by 3 and the ball or other rolling object by 4. The inclined plane may be made in a variety of ways without departing from my invention, but as one simple and inexpensive way to manufacture it I have shown a frame 5 on which is adapted to be received a piece of glass 6 or other smooth surfaced sheet material, the surface of which forms the inclined plane over which the ball 4 rolls. The frame is shown as being supported at one end on two leveling screws 7 and at the other end on a central rest or support 8. By adjusting the leveling screws the inclined plane can be set at different inclinations and may be leveled up transversely.

9 is a level of any suitable construction which assists in the adjusting of the frame.

The means for projecting the ball onto the plane is herein shown as a chute 10 arranged to deliver the ball to the inclined plane in a direction transversely thereto and at right angles to the inclination thereof. This chute has the bottom 11 which is set at an inclination, and the side guard 12 which holds the ball onto the chute until it has rolled off the end thereof, the side guard 12 extending beyond the bottom to a distance at least the radius of the ball.

When the instrument is properly set if the ball is placed at the upper end of the chute and is allowed to roll down the chute it will be projected from the chute onto the inclined plane in a direction at right angles to the inclination of said inclined plane, and as soon as the ball has rolled by the end of the side guard 12 of the chute said ball will be caused to roll toward the bottom of the inclined plane by the action of gravity. The object in making the side guard 12 of the chute longer than the bottom is so that before the ball rolls off from the side guard it has passed off from the bottom of the chute and is traveling on the inclined plane. When the ball is thus projected onto the inclined plane it will roll thereon and the line traced will indicate graphically the law of falling bodies as described above. To make a record of this line I use a record sheet 14 which is placed on the glass 6 and over which is placed an impression sheet 15 which may conveniently be ordinary carbon paper. When the ball rolls over the impression sheet 15 the weight thereof will cause an impression to be made on the record sheet 14 in the form of a curved line 40, which line will indicate the course traveled by the ball in rolling over the inclined plane, and which line will indicate graphically the law of falling bodies.

For convenience in reading the curved line I propose to use a record sheet which is ruled substantially as shown in Fig. 1 so that the spaces up and down on the sheet indicate space intervals or units of distance through which the body falls and the spaces transversely of the sheet indicate time intervals or units of time.

The record sheet 14 will preferably be positioned on the inclined plane so that the zero line of both the space intervals and the time intervals will pass through the point at which the ball is projected onto the plane, and when the record sheet is thus adjusted the distance which the object has fallen through different intervals of time is determined by noting the point where the line crosses the lines denoting time intervals.

To assist in properly positioning the sheet I provide the frame 4 with a sheet-positioning shoulder 20 against which the bottom of the sheet rests, and in placing the sheet on the paper it is positioned with the lower edge against the shoulder 20 and with the zero time interval line representing time intervals at the end of the side guard 12 of the sheet.

21 is a spring clip which may be used for assisting to hold the paper in proper position.

The chute 10 is preferably made adjustable to accommodate different sizes of record sheets, and to accomplish this I have shown said chute as having a clamping screw 23 projecting from the head 24 thereof which screw extends through a slot 25 in a guiding flange 26 that rises from the frame. The chute is held in adjusted position by means of a clamping nut 27. The record made on the record sheet may be more readily adjusted if the chute is adjustable so that the line on the bottom thereof along which the ball rolls will be in line with the zero space interval mark, as shown in the drawings.

At the lower end of the inclined plane I preferably form a pocket or groove 30 to receive the ball after it has rolled over said inclined plane, and I may also make the frame with a guard flange 31 which prevents the ball from rolling off from the side of the inclined plane.

The apparatus as above described is very simple to manufacture, and it affords means for not only testing the accuracy of the law of falling bodies but also provides a means for graphically illustrating said law.

The constructional details of the device may be varied in many ways without departing from the invention.

It is not essential to the invention that the inclined plane be constructed exactly as shown, nor that the ball be projected onto the sheet by the specific means shown although these constitute the preferred embodiment of my invention.

Having described my invention what I claim as new and desire to secure by Letters Patent is:—

1. In a device for determining the law of falling bodies, the combination with an inclined plane, of a ball, and means to project the ball onto the inclined plane in a direction at right angles to the inclination thereof.

2. In a device for determining the law of falling bodies, the combination with an inclined plane, of a ball, means to project the ball onto the inclined plane in a direction at right angles to the inclination thereof, and means to make a visible record of the course of the ball.

3. In a device of the class described, the combination with an inclined plane, of a ball to roll over said inclined plane, and a chute arranged to deliver the ball onto the inclined plane in a direction at right angles to the inclination thereof.

4. In a device of the class described, the combination with an inclined plane, of a ball to roll over said inclined plane, and a chute arranged to deliver the ball onto the inclined plane in a direction at right angles to the inclination thereof, said chute being adjustable in a direction at right angles to its length.

5. In a device of the class described, the combination with an inclined plane, of a ball to roll over said inclined plane, and a chute arranged to deliver the ball onto the inclined plane in a direction at right angles to the inclination thereof, said chute having a bottom inclined transversely to the surface of the inclined plane, and a side guard extending beyond the bottom.

6. In a device of the class described, the combination with a record-sheet-receiving inclined plane, of a record sheet thereon, a ball, means to project a ball onto the plane in a direction at right angles to the inclination thereof, and means to make on the record sheet an impression indicating the course of the ball thereover.

In testimony whereof, I have signed my name to this specification, in the presence of two subscribing witnesses.

JOHN C. PACKARD.

Witnesses:
EDWARDS BENTON,
EUGENE W. DAVIS.